United States Patent [19]

Sher et al.

[11] Patent Number: 4,585,535
[45] Date of Patent: Apr. 29, 1986

[54] ELECTROPHORETIC METHOD OF PRODUCING HIGH-DENSITY MAGNETIC RECORDING MEDIA

[75] Inventors: Arden Sher, Belmont; Karen Sabo, Fremont, both of Calif.

[73] Assignee: Savin Corporation, Stamford, Conn.

[21] Appl. No.: 710,586

[22] Filed: Mar. 11, 1985

[51] Int. Cl.[4] .................. C25D 13/02; C25D 15/00
[52] U.S. Cl. .......................... 204/180.6; 204/181.4; 252/62.53; 252/62.54
[58] Field of Search ............ 204/180.6, 181.6, 181 N, 204/181.4, 181.5

[56] References Cited

U.S. PATENT DOCUMENTS 3,846,356 11/1974 Hou et al. ............... 204/181.4
4,039,697 8/1977 Isawa et al. ............. 204/181.6

FOREIGN PATENT DOCUMENTS 50-28093 9/1975 Japan .................. 204/181.4
5025321 2/1977 Japan .................. 204/181.4
1354278 5/1974 United Kingdom ....... 204/181.4

Primary Examiner—Howard S. Williams
Attorney, Agent, or Firm—Shenier & O'Connor

[57] ABSTRACT

A magnetic recording medium having a coating of magnetic particles deposited thereon by electrophoresis. Magnetic particles are encapsulated by dry milling in a thermoplastic binder which is insoluble at ambient or room temperatures and is softenable at temperatures higher than 70° C. A charge director for producing functional sites in the binder is incorporated in the encapsulating polymer during the dry-milling step. The encapsulated mass is comminuted or pulverized and then wet-milled with a major amount of a low-boiling aliphatic hydrocarbon liquid. A suspension is then formed with additional hydrocarbon liquid. Additional charge director may be added, either during the wet-milling step or during the suspension-forming step. The suspension is then used as a bath from which the coating is deposited by electrophoresis. The magnetic particles are oriented by the application of a magnetic field, either during the depositing step or subsequent thereto. If subsequent, the binder is heated to soften the same. The final coating is then cured by any appropriate means, such as an electron beam.

11 Claims, 7 Drawing Figures

ELECTROPHORETIC METHOD OF PRODUCING HIGH-DENSITY MAGNETIC RECORDING MEDIA

BACKGROUND OF THE INVENTION

A proliferation of tape recorders for live music, dictation, and video signals of films and television broadcasts has recently taken place. This has been augmented by computers and word processors, which require software in the form of floppy disks or hard disks. These are conventionally prepared from liquid dispersions of magnetic material. In order to achieve well-suspended magnetic particles, the dispersion has been spun onto disks to obtain a thin coating. While the coating was still wet, the coated disk has been placed in a magnetic field to orient the magnetic particles. Then the disk was cured, usually by a complex heat cycle. The yield from this method has been very poor.

It has been suggested by the prior art that magnetic material, such as finely divided ferric oxide particles, may be suspended in water and deposited on a tape by electrophoresis. We have found that other liquid carriers with low dielectric constants and high resistivities—in particular, ISOPARs—are superior materials for this purpose. In order for electrophoresis to take place, the toner particles must be charged with the right polarity. This is the office of the charge director. The liquid toner bath, consisting of ISOPAR plus toner particles and charge director, must be nearly electrically neutral. Thus, the charge director not only introduces charges on the toner particles, but also equal numbers of opposite charges associated with particles, called counter ions. The counter ions may be charged individual molecular ions, chain polymers, micells, or other molecular agglomerates. There are two possible ways a charge director can serve its function. In the first, the charge director consists of neutral entities until they are mixed with the toner particles. Then, due to enthalpy differences between the charge director and the toner particles, which induce a chemical reaction, the toner takes one sign of charge and the charge-director molecules the other. This can occur because electrons exchange between the two types of particles or because an ionic molecular group transfers from the charge-director molecules to the toner particles. The second and more common way in which a charge director functions is that it is an ionic solution in the liquid carrier before it is mixed with toner particles. Then one of the ionic species preferentially attaches to the toner particles when the toner and the charge director are mixed. The sign of the ion that attaches to the toner depends in general on the surface properties of the toner particles and the ionic species in the charge director. A given charge director may charge one toner material positively and another negatively or not at all. The preferred arrangement is to have the larger of the two ionic species attach to the toner so the smaller, more mobile, one serves as the counter ion.

If the toner suspension is under-charge-directed or the ion attachment probability is low so there is on average less than one charge-director ion (of the right sign) attached per toner particle, then there is a tendency for the toner particles to form floccules. The mechanism responsible for this flocculation arises because a neutral toner particle adjacent to a charged one will experience an induced dipole that results in an attractive force, causing the particles to bind together.

The toner particles in the bath will all reach the same equilibrium chemical potential. In equilibrium, the charge on a given particle will be larger if it has a larger radius—because its capacitance is inversely proportional to the radius—and if the number of surface sites to which charge-director ions attach (called "hooks") is larger. The viscous drag on a particle in a liquid is also proportional to its radius. Therefore, the mobility, which is proportional to the charge per particle and inversely proportional to the viscous drag, will tend to be independent of particle size if the density of surface hooks is the same on all particles. This means that particles with uncontrolled hook densities will respond differently to the fields, tending to produce non-uniform deposits of toner. The result is that the toner particles having the largest mobilities will move out of the developing liquid first, leaving the sluggards behind. As this progresses, even if the bath is replenished to maintain a constant toner-particle density, particle deposit in subsequent applications of the developing dispersion will become less dense and the dispersion is said to be "exhausted".

If a toner suspension is over-charge-directed, in the second case where it is an ionic solution, then there may be extra ions in the bath with the same sign as the toner particles. This is described in the art as a circumstance where the toner has "continuous phase conductivity". When there is continuous phase conductivity, the ions with the same sign as the toner particles compete with them to reach the image area. The result is a lower toner density reaches the charged substrate than optimum. The continuous phase conductivity also has an adverse effect on the efficiency of toner transfer from a surface onto which it is originally deposited to a carrier in a printing application.

We have discovered that it is possible to produce substantially homogeneous films of ferromagnetic particles, such as ferric oxide, by encapsulating them in a thermoplastic resin. The resin must be such that it is insoluble in the liquid dispersant, such as ISOPAR (trademark for a series of low-boiling isomerized aliphatic hydrocarbon liquids manufactured by Exxon Corporation). Furthermore, the coating, or encapsulant, must be such that it will melt after deposit to yield a smooth surface and permit orientation of the ferromagnetic particles. In addition, the surface of the encapsulant should have a plurality of functional sites to accommodate a charge director. This enables us to produce encapsulated ferromagnetic particles, such as ferric oxide, which are controllably charged and have the same mobilities. Thus, the field introduced to cause electrophoresis will drive the electrophoretically mobile toner particles into place without exhausting the suspension. We may consider the relationship of the encapsulant and the charge director as being analogous to ion-exchange or acid-base phenomena.

FIELD OF THE INVENTION

Our invention relates to a method of electrophoretically depositing a ferromagnetic material on a tape, or a floppy disk, or a hard disk, or a rectangular, plastic security card, to produce high-density recording media, and a composition of matter useful in practicing the method.

DESCRIPTION OF THE PRIOR ART

Japanese Pat. No. 50-28093 discloses the electrodeposition of a paint obtained by emulsifying a resin with a magnetic pigment in water. The paint is applied electrophoretically onto an aluminum disk. The emulsion is composed of 40 parts by weight of an emulsifiable acrylic resin, 4 parts by weight of water-soluble melamine resin, 160 parts by weight of gamma ferric oxide, 10 parts by weight of isopropanol, 7 parts by weight of tri-isopropanolamine, and 279 parts by weight of ion-exchanged water.

Japanese Pat. No. 52-25321 uses a similar composition, except that the emulsion includes an organic solvent which serves to emulsify the water-soluble acrylic acid polymer. Methyl isobutyl ketone is given as a preferred example.

SUMMARY OF THE INVENTION

In general, our invention contemplates the dry encapsulation of magnetic pigment particles with a binder, such as wax, a waxy polymer, or a mixture of polymers, together with an agent for producing a significant number of functional sites, such as a charge director. The encapsulation must be such that the encapsulated pigment will survive the rigors of the encapsulation and wet milling without damage to the pigment. The encapsulant must be insoluble in the dispersant. The encapsulation takes place by dry-milling the encapsulating wax or waxy polymer mixture and a composition for producing functional sites. The dry-milled material is then ground and wet-milled in an attritor with ISOPAR-G, ISOPAR-H, ISOPAR-L, or ISOPAR-M. The wet milling of the finely ground primary dry dispersion results in the formation of a uniformly encapsulated pigment dispersion. Additional or different charge director may be added during the diluting step. This charge director will impart the desired polarity to the coated toner particles uniformly by being chemically attached to the functional sites, or hooks. Owing to the homogeneous coating, the heterogeneous nature of the magnetic pigment is insulated and the toner exhaustion which is characteristic of liquid dispersions of the prior art is obviated.

OBJECTS OF THE INVENTION

One object of our invention is to provide a method of producing magnetic recording media by electrophoretic deposit which will give better control of the thickness of the deposited layer.

Another object of our invention is to provide a method of producing magnetic recording media which is of uniform thickness and free from pinholes.

Still another object of our invention is to provide a method of producing magnetic recording media rapidly and continuously in mass production.

A further object of our invention is to provide a suspension of encapsulated acicular ferromagnetic particles free from breakage during the encapsulation and grinding steps.

A still further object of our invention is to provide a method of producing magnetic recording media which isolates the coating step from the orientation step.

An additional object of our invention is to choose a binder with a suitable melting point so that, after the film is deposited, it can be melted while exposed to a magnetic field that causes the particles to orient. The orientation is subsequently frozen when the temperature is reduced below the melting point of the binder.

Another object of our invention is to provide an encapsulated ferromagnetic material in which the encapsulating binder contains a composition for imparting functional sites to the encapsulating binder.

Still another object of our invention is to select encapsulant binder materials that can be cured by an electron beam or thermally cured into hard surfaces capable of withstanding the wear caused by the passage of recording heads over them.

A further object of our invention is to provide a method using electric or magnetic field gradients, or both, as well as uniform magnetic fields oriented perpendicularly to the surface, both to orient acicular magnetic particles in the molten binder and to properly position the particles relative to the top surface.

Other and further objects of our invention will appear from the following description.

BRIEF DESCRIPTION OF THE DRAWINGS

In the accompanying drawings, which form part of the instant specification and which are to be read in conjunction therewith, and in which like reference numerals are used to indicate like parts in the various views.

DESCRIPTION OF THE PREFERRED EMBODIMENT

Figure 1:
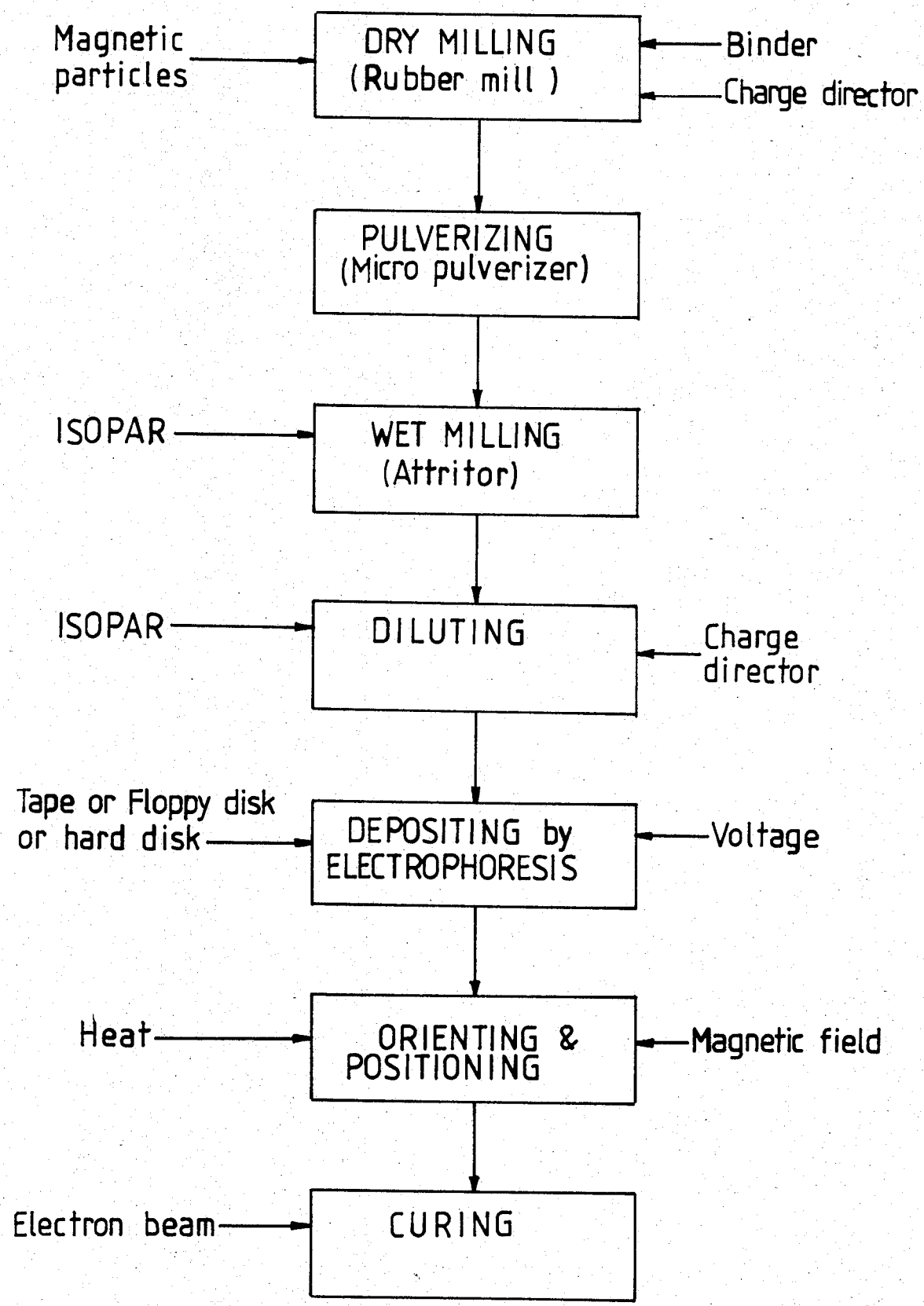
FIG. 1 is a flow sheet showing the steps of the method for carrying out our invention.

Referring to FIG. 1, we charge 84 grams of carnauba wax, 42 grams of A-C 540 (trademark of Allied Chemical Corporation for ethylene-acrylic acid copolymer), and 392 grams of a gamma ferric oxide ($Fe_2O_3$, sold by Pfizer Inc. under the trade name "Pferox",) into a two-roll rubber mill known to the art. We also add 42 grams of A-C 201 (trademark of Allied Chemical Corporation for calcium salt of ethylene-acrylic acid copolymer). The A-C 540 and the A-C 201 act as a charge director to produce the functional sites, or hooks, with which the charge director may react. Another addition agent for controlling functional sites is stearic acid. The A-C 540 may, in and of itself, act as a binder. Other addition agents for the control of functional sites are styrene-acrylate copolymers, ethylene-vinyl acetate-acrylic acid plus copolymers, oxidized polyethylenes, acrylate ester polymers, acrylate ester-acrylic acid copolymers, styrene-allyl alcohol copolymers, polyethylene oxide polymers, and propylene-ethylene oxide copolymers. While these polymers are added to control the functional sites for the binder, they in themselves may act as binders. Carnauba wax is especially useful since it functions as a lubricant after the recording media has been formed. Furthermore, all of the materials charged in the first step of our process are insoluble or unsolvatable in ISOPAR at temperatures below 40° C. The magnetic pigment, the binder, and the agent for controlling functional sites are blended in a rubber mill at 60° C. for one hour, at which time the pigment is uniformly dispersed. We have also blended the pigment and the binder in a rubber mill at 130° C. The higher temperature shortens the time for dispersing the pigment.

On cooling, the encapsulated magnetic particles form a crayon-like solid, which is then powdered. We then charge the powder from the pulverizing step and 2100 grams of ISOPAR-H to the wet-milling step, which takes place in an attritor. While the pulverizing step reduces the time that is necessary to wet-mill the powder, it will be understood that the crayon-like solid coming from the rubber mill can be comminuted into smaller particles by any desired means which will enable the pieces formed to be conveniently charged to the attritor. We then wet-mill the encapsulated magnetic particles for five hours. Longer milling improves the dispersion and produces smaller average particle sizes. The powder charged to the wet-milling step comprises spheres containing a plurality of encapsulated magnetic particles. We may use either Pferrox 4230 or Pferrox 2228C. These have a diameter of approximately 0.03 to 0.04 micron and an aspect ratio of between 1:6 and 1:7. A number of these acicular or dendritic magnetic particles are present in each sphere. It is to be understood that any appropriate ferromagnetic material may be employed.

The nonpolar dispersant liquids used in the wet-milling step are isomerized aliphatic hydrocarbons—more particularly, ISOPAR-G, ISOPAR-H, ISOPAR-K, ISOPAR-L, and ISOPAR-M. These ISOPARs are narrow cuts of isoparaffinic hydrocarbon fractions with extremely high levels of purity. For example, the boiling range of ISOPAR-G is between 156° C. and 176° C. ISOPAR-L has a mid-boiling point of approximately 194° C. ISOPAR-M has a flash point of 77° C. and an auto-ignition temperature of 338° C. Stringent manufacturing specifications, such as sulphur, acids, carboxyl, and chlorides are limited to a few parts per million. They are substantially odorless, possessing only a very mild paraffinic odor. They have excellent odor stability and are all manufactured by the Exxon Corporation.

All of the dispersant liquids have an electrical volume resistivity in excess of $10^9$ ohm centimeters and a dielectric constant below 3.0. The vapor pressures at 25° C. are less than 10 kPa. A desirable ISOPAR is ISOPAR-G, which has a flash point, determined by the tag closed cup method, of 40° C. ISOPAR-L has a flash point of 61° C., determined by the same method; while ISOPAR-M has a flash point, determined by the Pensky-Martens method, of 77° C. While we have described the preferred dispersants, the essential characteristics are the volume resistivity and the dielectric constant. In addition, a feature of the dispersants is a low Kauributanol value, in the vicinity of 27 or 28, determined by ASTM D 1133.

The addition agents which are present not only act as the control for the functional sites, but increase the melt viscosity of the carnauba wax. In addition, these materials can be cross-linked to cure the deposit into a hard, durable surface. The material discharged from the wet-milling step is a liquid concentrate in which the solids-to-dispersant ratio is approximately 40 percent. We then dilute the concentrate with ISOPAR so that the solids-to-dispersant ratio is approximately 20 percent. This dispersion is then stored for future use. When it is desired to use the solution to deposit a magnetic coating on a substrate for use as recording media, we dilute the stored dispersion with ISOPAR so that it contains a solids content of about 2 percent in respect of the liquid.

While we have shown a charge director being added in the dry-milling step and in the diluting step, it is to be understood that a charge director, if desired, may be added in the wet-milling step. There are two apparently different kinds of charge directors. In the first case, the charge director in ISOPAR has a conductivity measured at 1 kHz that is larger than the conductivity obtained when it is mixed with toner particles. Lecithin and barium petronate (BaPet) are examples. In the second case, the charge director in ISOPAR has almost no conductivity. However, when it is mixed with toner particles, there is a substantial conductivity. Barium sulfosuccinate (BaOT) and salts of bistridebyl suflosuccinate are examples of this case.

The preferred charge directors are those with no conductivity in the absence of toner particles. Any excess conductivity results from the presence of ions in the bath with the same sign as that of the toner particles. These unwanted ions respond to the same fields driving the toner and deposit charge without pigment.

The charge per toner particle (about 0.5 to 3.0µ radius) has been measured to be in the range of 100 to several hundred charges. The zeta potentials arising from these charges are of the order of 1 V, large compared to thermal energies. This is made possible by the high density of functional sites on each toner particle (about $10^4$ to $10^6$ sites) and the nature of their chemical reactions with the charge-director molecules.

The dispersion stability is caused by the large charge per toner particle. The repulsive forces between like-charged particles keep them apart when the separation is large, and long molecules that act as bumpers (produce steric hindrance) prevent the surfaces of the toners from approaching closely enough to one another so that the induced dipole attractive interaction can become effective and cause agglomeration. The coulomb repulsive interaction varies as the reciprocal of separation between the particles, while the charge-induced attractive dipole interaction varies as the fourth power of the reciprocal of their separation. As long as the particles stay far enough apart, the repulsive interactions dominate and the dispersion is stable. If the particles are allowed to begin to agglomerate, their capacitance changes, the charge per particle changes, and the bath properties degrade.

While charge director is added in the encapsulating step, additional charge director can be added during the wet-milling step or to the dispersion in the depositing step. The addition of the charge director during the wet-milling step tends to improve the dispersion. The ideal amount of charge director would produce the same number of negatively charged entities as there are pigment particles; that is to say, there would be no excess free negatively charged ions. An excess number of negative ions increases the conductivity of the liquid, adding a continuous phase conductivity to the development liquid. There is another condition that sets an upper limit on the amount of charge director used. The mobility of the counter ions should exceed that of the toner particles. In this case, when an external electric field is applied that is intended to drive the toner particles onto the substrate, the more mobile counter ions will respond first, leaving a depletion layer of space charge adjacent to the deposition substrate and accumulating on the opposite electrode. The thickness of the depletion layer depends on the applied voltage and the carrier concentration. Once the depletion layer forms, it is the only region where there are fields present to drive toner particles onto the substrate. The toner particles then move to the surface under the influence of space-charge-limited-current conditions. This is desirable since, in this circumstance, the spatial distribution of particles reaching the surface is more uniform than a random particle-distribution. The resulting films tend to be uniform, smooth, and free of pinholes. If too much charge director is used and the mobility of the toner particles exceeds that of the counter ions, they will not deposit under space-charge-limited-current conditions.

The depositing step is carried out in a bath containing approximately 2 percent by weight of the encapsulated magnetic particles which have been charge-directed. The size-distribution of the coated magnetic particles will vary. However, the mobility of the small particles and of the large particles is approximately the same, provided the hook density is independent of particle size. The large particles will accumulate more charge, but they will have more viscous drag than the smaller particles. Conversely, the smaller particles will have a lesser charge, but will exercise a lower viscous drag while moving through the dispersant liquid. The result is that the particle size is self-compensating. The drift velocity of the particles is a function of the applied field. The higher the field, the more rapid is the drift velocity. Varying the potential of the applied field enables us to control the thickness of the deposited layer. If we are depositing on a metal disk, for example, we may use a potential of between 400 volts and 1000 volts with the metal being connected to the positive electrode. The time of subjection to the field may vary between 0.001 and 1 second. When it is desired to deposit on an insulating carrier such as Mylar tape, we back the tape with a positive electrode and apply a voltage of between 2000 volts and 5000 volts. Again, the thickness of the deposit is controlled by the length of time the carrier is in the field. Alternatively, deposits on tape or other insulators can be made by first subjecting the substrate to a corona charging step and then passing the charged medium through a development region where toner is attracted to it.

After the electrophoresis has been completed, the surface of the coated carrier will be wetted by the bath. Since the bath contains particles which have not been deposited, it is undesirable to have these remain on the surface of the media. Accordingly, we clean the surface by any means known to the art, as, for example, by wiper blades, doctor blades, air knives, squeegee coronas, and cleaning rollers, including reverse rollers, so as to leave a thin layer of liquid on the surface of the freshly deposited magnetic layer.

It will be observed that all of the binders and agents soften at a temperature below 140° C. For example, A-C 540 softens at 108° C. It has a Brookfield viscosity of 500 cps at 140° C. It is important that the carrier bearing the deposited coating be passed to the orienting step before it is dry, in order to prevent a "mud crack" pattern. For a crack-free deposit, the surface of the deposit must be wet before heating in the orienting step is started. During heating, the magnetic pigment particles will have no particular orientation. The orientation of the magnetic particles may be controlled to extend longitudinally or substantially vertically. Vertical magnetic recording is favored because it will produce high-density packing. With vertically oriented particles, transitions between regions with magnetization up or down can be very sharp because demagnetization presents no problem at high density, even in relatively thick media. However, the vast number of recordings on the market and the reading heads of these recordings require longitudinal orientation.

EXAMPLE I

The procedure described above in respect of FIG. 1 was followed, using 392 grams of Pferox 4230, 84 grams of carnauba wax, 42 grams of A-C 540, 42 grams of A-C 540 partially neutralized with 1.56 grams of calcium hydroxide [Ca(OH)$_2$], and 2100 grams of ISOPAR-H.

EXAMPLE II

The same procedure as in EXAMPLE I was followed, except that 42 grams of the A-C 540 were partially neutralized with 1.39 grams of magnesium oxide [MgO].

EXAMPLE III

The procedure of EXAMPLE II was followed, except that the rubber mill was charged with 168 grams of A-C 540 and no carnauba wax was used. Furthermore, 392 grams of Pferox 2228HC were used.

EXAMPLE IV

We charged 392 grams of Pferox 2228HC, 135 grams of carnauba wax, 66 grams of A-C 540, and 66 grams of A-C 201 into the rubber mill and blended the ingredients at 130° C. A crayon-like chip was removed from the rubber mill and pulverized to a powder in a micropulverizer. The powder was then charged to the wet-milling step, to which 2500 grams of ISOPAR-H were added. The attritor was operated for five hours to obtain a suspension. A portion of the suspension was diluted with ten times its weight of ISOPAR-H and passed to the depositing step. A number of baths were made, containing different concentrations of solids from between 5 percent by weight to 0.3 percent by weight. The deposit on a metal disk was determined by weighing the disk before and after electrophoresis. We found that the weight of the deposit varied as a function of the concentration solids.

EXAMPLE V

The procedure of EXAMPLE IV was followed, except that the attritor was run for twenty-four hours. The charge director was 8.4 grams of barium salt of ditridecyl sulfosuccinate.

The deposition step is effected, as pointed out above, by applying a potential to cause the charged particles to deposit on the substrate. The thickness of the coating is not only a function of the concentration of solids in the bath, but also varies as a function of the voltage and of the time. It is possible to completely exhaust the bath of magnetic particles, between the development electrode and the disk substrate, by allowing sufficient time for the depositing step to proceed. The length of time the operating voltage is imposed may vary between 0.1 second and 2 seconds or more.

Figure 2:
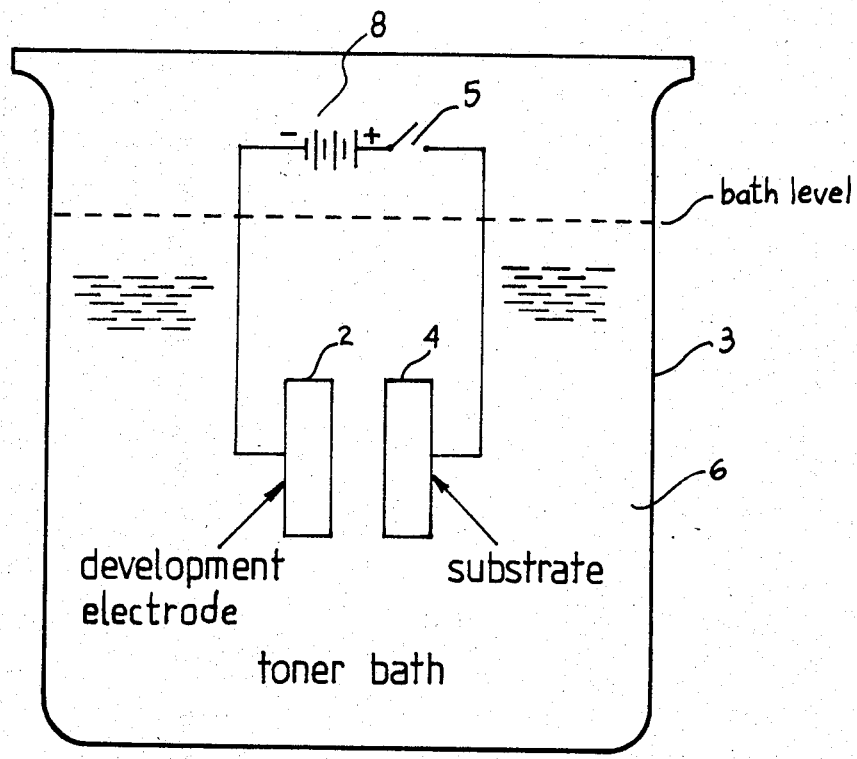
FIG. 2 is a diagrammatic view showing one arrangement for depositing magnetic particles onto a substrate.

The deposition onto substrates has been accomplished in a number of different ways. Referring now to FIG. 2, a development electrode 2 is placed parallel to the substrate 4 and separated from it by 0.1 to 5 mm. The separation is usually placed at 1 mm. The assembly is then inserted into the toner bath 6 in a container 3, and a voltage pulse from a source of potential 8 is applied for a prescribed time by closing switch 5. The assembly is then removed from the bath, the development electrode is separated from the substrate, and the excess liquid is removed by dipping the substrate into pure ISOPAR, by spinning it off, and by passing an air knife (not shown) over the surface. The substrate is then placed onto a heater (not shown), while it is still wet, and its temperature is raised to the melting point of the binder. This heating step is done while the part is exposed to a uniform magnetic field. The temperature is then lowered below the melting point, to solidify the binder, while the part is still in the magnetic field. The orientation of the magnetic particles is thus fixed in the hardened solid. To accomplish the circumferential longitudinal orientation needed for a hard or floppy disk, we follow orientation procedures known to the art while the disk is heated above the melting point of the binder. The perpendicular orientation is accomplished by placing the substrate parallel to the pole pieces of a C-shaped magnet during the heating cycle.

Figure 3:
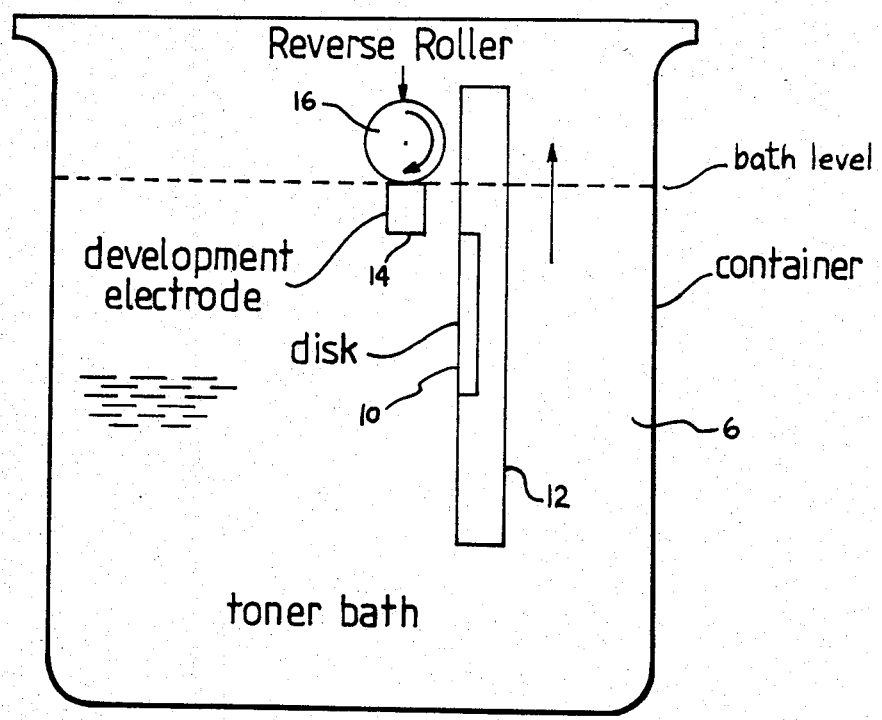
FIG. 3 is a diagrammatic view showing another arrangement for depositing magnetic particles onto a substrate.

Referring now to FIG. 3, we have made deposits onto a metal disk 10 carried by a movable table 12. The assembly is normally submerged in the toner bath 6 and is raised at a uniform speed of from 1 to 10 inches per second out of the bath. A development electrode 14 applies potential between it and the substrate disk 10, as is shown in FIG. 2. A reverse roller 16, known to the art, removes excess toner and the disk 10 is then subjected to the heating and orientation steps heretofore described.

Figure 4:
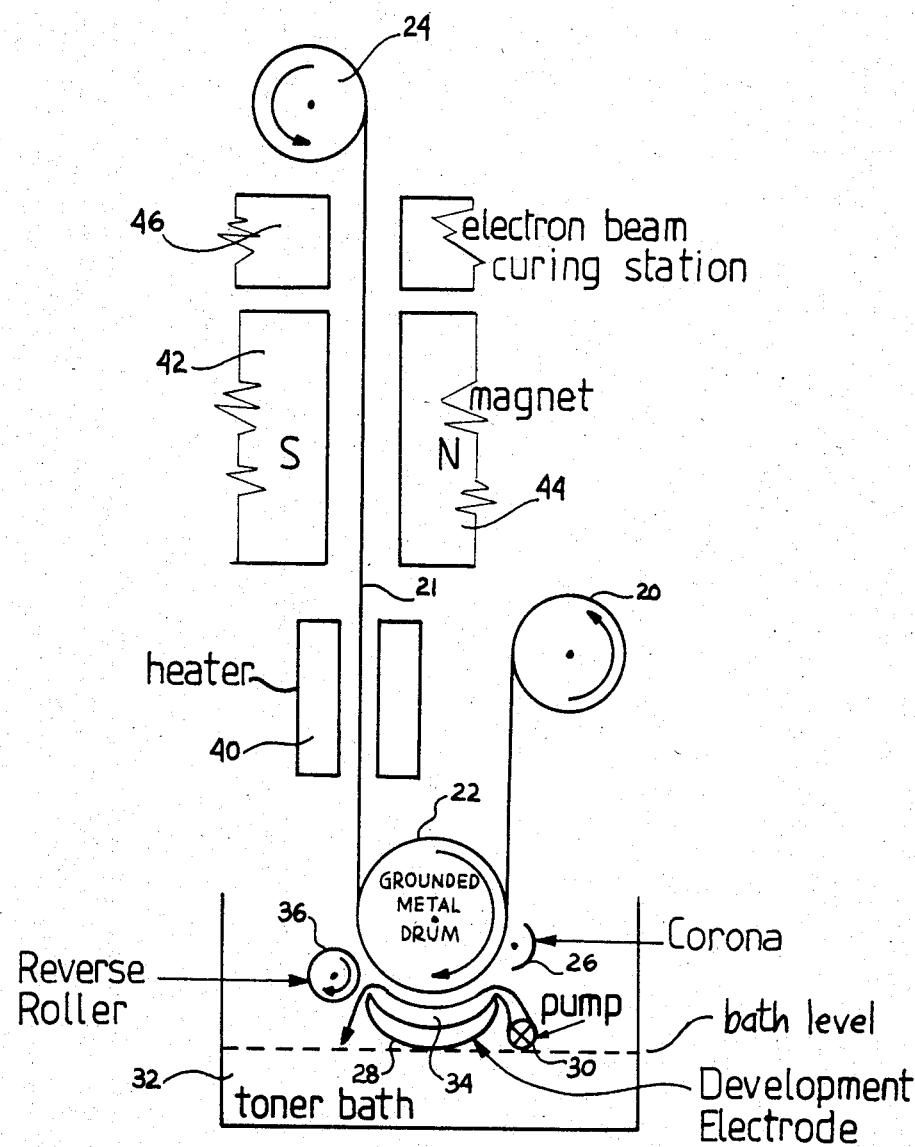
FIG. 4 is a diagrammatic view showing apparatus for depositing magnetic particles on a continuous web.

FIG. 4 is a diagrammatic showing of a form of apparatus for preparing a deposit on a continuous tape. A roll of tape 20 is passed around a grounded metal drum 22 and rolled onto a receiving roller 24. The tape segment 21, which passes between the grounded drum 22 and the receiving roller 24, has been subjected to the action of a corona 26 and passed between a development electrode 28 and the grounded metal drum 22. A pump 30 pumps toner liquid from a toner bath 32 to a pool of toner 34 in the concave electrode 28. The overflow from the pool 34 returns to the toner bath 32. A reverse roller 36 removes excess liquid from the coated tape. While we have shown the metal roller 22 as grounded, it may be insulated from ground and subjected to a voltage if desired. The freshly coated web section 21 passes between heater elements 40 adapted to soften the polymer, or binder, present in the toner. While we have used the term "toner", it is to be understood that we refer to the developing liquid having dispersed therethrough a binder, magnetic particles, a diluent such as one of the ISOPARs, and a charge director. Stated otherwise, the toner bath is prepared according to the first four steps shown in FIG. 1.

While our disclosure has been directed principally to acicular magnetic particles, it is to be understood that our invention is applicable to ferromagnetic or ferriferous particles which have any desired morphology, though acicular magnetic particles having either perpendicular or longitudinal orientation are preferred.

What is deposited by electrophoresis onto the web is the binder and the magnetic particles. The web containing the softened binder is passed through a field created by a magnet, the south pole 42 and the north pole 44 of which are shown diagrammatically in FIG. 4. The magnetic flux will orient the magnetic particles to the desired orientation, depending on the direction of the field. The speed of the passage of the web section 21 and the length of the magnetic field are such that the temperature of the web will fall below the hardening point of the binder before the coated web exits from the magnetic field. It will then pass through an electron-beam curing station, shown diagramatically and indicated by the reference numeral 46.

It is known to the art that, with acicular magnetic particles and with the proper field direction, perpendicular orientation will take place. Magnetic particles which are deposited in the normal spin process or in electrophoretic deposition are usually randomly distributed and randomly oriented. The effect of the magnetic field is to apply a torque to the particles, which causes them to orient themselves in alignment with the lines of flux of the applied field. Owing to the fact that the centers of the particles are initially randomly distributed, the tops of the particles, after orientation, are positioned at random distances from the surface of the web. Interactions among the particles tend to enhance the mean square distance between the surface of the web coating and the tops of the particles. This phenomenon produces noise in a recording. Examination of the particles oriented with a perpendicular field under magnification reveals this varying distance of adjacent particles from the top surface of the web coating. This appearance is similar to a view of the tall buildings of the New York skyline. Accordingly, it has been called the "Manhattan Vista" effect. This "Manhattan Vista" effect can be eliminated if, during the orientation process in the magnetic field, in addition to the torque caused by the uniform field, forces are applied to the particles which will cause their centers of mass to move so that all particle tops will be substantially equidistant from the web coating surface.

Figure 5:
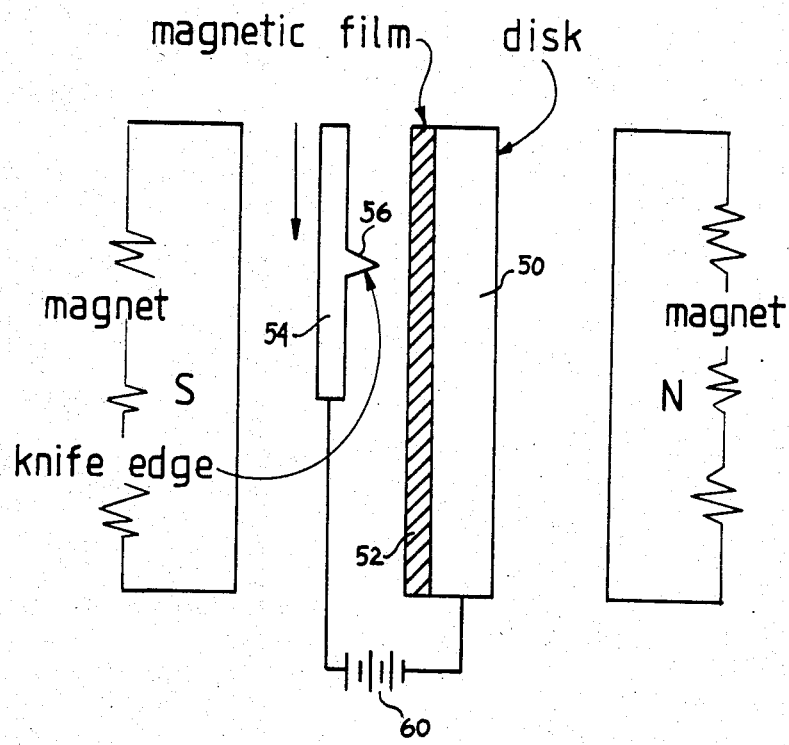
FIG. 5 is a diagrammatic view showing another arrangement of apparatus for depositing magnetic particles which eliminates the "Manhattan Vista" effect.

Referring now to FIG. 5, we have shown a method of reducing the "Manhattan Vista" effect. We have shown a disk 50, similar to the disk 10 of FIG. 3. This disk has been freshly coated with a film 52 containing magnetic particles and is in a softened condition, having just been subjected to thermal energy. A potential is applied between the disk 50 and a metal member 54, which is a conducting but nonmagnetic material and which is formed with a knife edge 56. A potential is applied between the disk 50 and the metal member 54 from a voltage source 60. Thus, an electric field gradient is applied to the surface of the film 52. The dielectric constant of the magnetic particles is greater than that of the binder of the film. Accordingly, there is a net force on the magnetic particles relative to the binder which causes them to move toward the surface of the film. The field gradient will also tend to disorient the particles somewhat. However, their orientation parallel to the lines of flux of the uniform magnetic field is also present. We have accomplished the same result by applying a sharp-edged wedge of magnetic material instead of the knife edge of FIG. 5.

Figure 6:
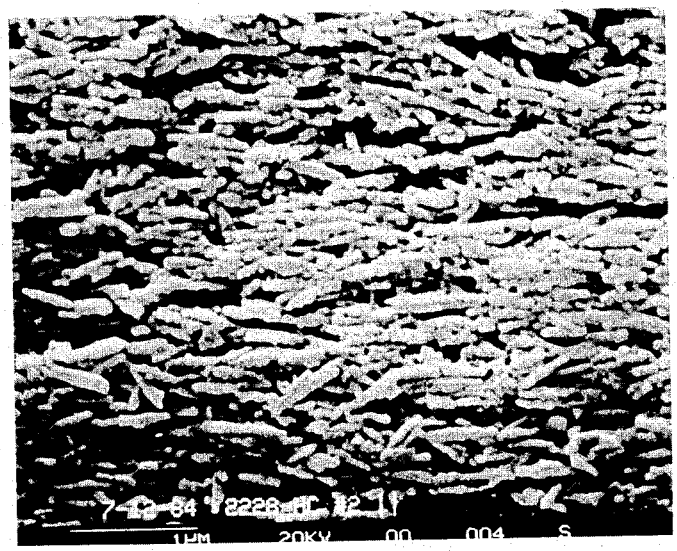
FIG. 6 is a scanning electron micrograph of magnetic particles oriented longitudinally, magnified 22,500 times.
Figure 7:
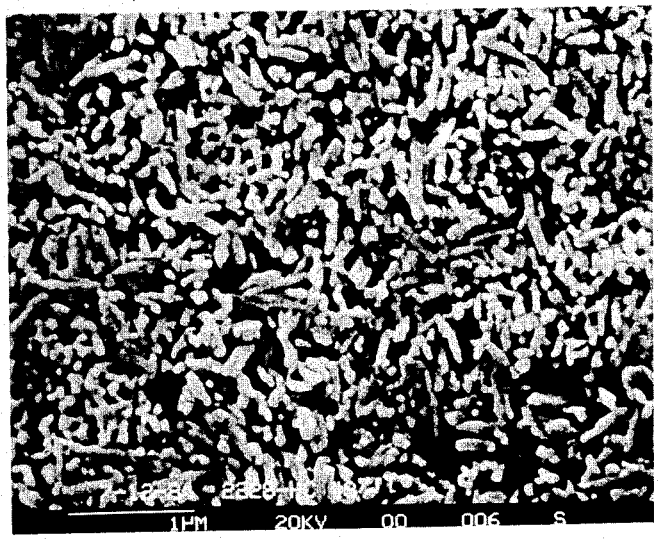
FIG. 7 is a scanning electron micrograph, similar to FIG. 2, showing magnetic particles oriented perpendicularly, magnified 22,500 times.

As pointed out above, the direction of the magnetic field determines whether the magnetic particles align themselves vertically or horizontally. An example of longitudinal or horizontal achievement is shown in FIG. 6. An example of perpendicular or vertical orientation is shown in FIG. 7. These photomicrographs were taken with a scanning electron beam microscope with a magnification of 22,500 times. The bar represents a scale measurement of one micron. The electron beam energy employed was 20 Kv. The picture was taken looking straight down onto the top surface of the sample. This is indicated by the "00" on the photomicrograph. The "S" indicates the scanning electron beam microscope was operated in the secondary electron collection mode. The orienting step has a further advantage in that the magnets remove all visible solids from the bath.

Since the end product of our process is a magnetic recording tape, floppy disk, or hard disk, it is desirable that the coating incorporate a lubricant. Carnauba wax is an excellent lubricant. If stearic acid is used to produce ionic sites, it also acts as a lubricant.

The perpendicular orientation of the toner particles will produce high-density recordings. These may be achieved, not only with acicular magnetic particles, but with barium ferrous oxide platelets ($BaFe_{12}O_{19}$). Magnetic particles having other morphologies may likewise be employed. It will be understood by the art that the read-and-write head designs must be matched to the morphology and orientation of the record.

It will be observed that, in the orienting step, we heat the polymer to its melting point, so that the magnetic particles will be able to orient themselves under the influence of the magnetic field. This not only enables orientation of the particles, but tends to align them adjacent the surface of the coating film. After the orientation step, we cure the coating. The A-C 540 binder lends itself readily to curing by an electron beam. Any appropriate curing technique, depending on the nature of the binder, may be employed.

It will be understood that the various compositions in the examples set forth above have been subjected to the steps shown in FIG. 1 and have produced excellent results.

EXAMPLE VI

The method of EXAMPLE IV was followed, except that we used 66 grams of Acryloid DM-54, instead of A-C 201. This is an acrylic resin, manufactured by Rohm and Haas Company, which acts as a charge director.

EXAMPLE VII

The procedure described in respect of FIG. 1 was followed, except that we used 392 grams of Pferrox 2228 HC (a product of Pfizer Inc.), 84 grams of carnauba wax, and 84 grams of A-C 540. In addition, we added 9 grams of the barium salt of ditridecyl sulfosuccinate as the charge director in the dry-milling step. The procedure of FIG. 1 was continued through the diluting step until a toner bath having a solids content of 1.5 percent was achieved. The toner particles were approximately 1 micron in diameter and consisted of several unoriented ferrous oxide particles embedded in the binder. The toner bath was then employed to electrophoretically deposit a thin layer of magnetic particles on an aluminum substrate. The electrophoretic deposition step takes place quite rapidly. Thus, our process may be used to deposit a magnetic coating on a web moving at high speed.

None of the prior art discloses the encapsulating of magnetic, ferriferous, or ferroxagnetic particles. By dry milling in the presence of a charge director, we can control or provide functional sites. In preparing a developing liquid for photocopying machines, we continue the process by the steps of comminuting and wet milling and then diluting the paste from the wet-milling step.

It will be seen that we have accomplished the objects of our invention. We have provided a method of producing magnetic recording media by electrophoretic deposit, in which we are better enabled to control the thickness of the deposited layer. Our method produces a magnetic recording coating on a carrier which is not only of uniform thickness, but is substantially free of pinholes. Our method of producing magnetic recordings proceeds rapidly and continuously and is thus especially adapted for use in mass production. We provide a suspension, useful in practicing our method, which comprises encapsulating acicular ferromagnetic particles and thus enables us to reduce breakage of these particles during a grinding step. Our method enables us to produce magnetic recording media in which the coating step may be isolated from the orienting step, so that the magnetic particles may be given any desired orientation. We have provided a composition, useful in practicing our method, which composition includes an encapsulating binder adapted to enshroud magnetic particles or other particles, together with means for imparting functional sites to the encapsulating binder. These functional sites enable us to impart a charge of the desired polarity to the binder, whereby to control the rate of electrophoretic deposit of a coating for a given applied potential.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of making a composition adapted to deposit a magnetic coating by electrophoresis on a carrier medium including the steps of dry-milling a major amount of magnetic particles with a minor amount of a binder and a minor amount of charge director to produce a solid chip of encapsulated magnetic particles, comminuting said chip into small pieces, wet-milling a minor amount of said chip pieces with a major amount of a low-boiling aliphatic hydrocarbon liquid to produce a suspension, depositing encapsulated magnetic particles from said suspension on a carrier medium by electrophoresis, orienting said magnetic particles, and then curing the binder to produce a magnetic recording medium.

2. A method as in claim 1 in which additional charge director is added in the process before the depositing step.

3. A method as in claim 2 in which additional charge director is added in the wet-milling step.

4. A method of making a composition adapted to deposit a magnetic coating by electrophoresis on a carrier medium including the steps of dry-milling a major amount of ferriferous particles with a minor amount of a binder and a minor amount of a charge director adapted to produce functional sites to form a solid chip of encapsulated ferriferous particles, reducing the chip to a powder in a micropulverizing step, wet-milling a minor amount of said powder with a major amount of a low-boiling aliphatic hydrocarbon liquid and a charge director to produce a suspension, depositing encapsulated ferriferous particles from said suspension on a carrier medium by electrophoresis, orienting said ferriferous particles, and then curing the binder to produce a magnetic recording medium.

5. A method as in claim 4 in which said carrier medium is metal and in which the thickness of the deposit during the electrophoretic depositing step is controlled by an application of voltage between 400 volts and 1000 volts for a period of between 0.001 second and 1 second.

6. A method as in claim 4 in which said micropulverizing step forms a powder having an average particle size of 200 microns.

7. A method as in claim 4 in which said wet-milling step is carried on with sufficient low-boiling aliphatic hydrocarbon liquid to produce 40 percent solids.

8. A method as in claim 4 in which said suspension is diluted to 20 percent solids in order to enable storage of the composition.

9. A method as in claim 4 in which said suspension is diluted to between 1 percent solids to 5 percent solids before practicing the depositing step.

10. A method as in claim 4 in which said carrier medium is an insulator and the applied voltage during the electrophoretic depositing step is between 2000 volts and 5000 volts.

11. A method as in claim 4 in which there are a plurality of magnetic particles present in powder form during the micropulverizing step.

* * * * *